United States Patent [19]
Allie et al.

[11] Patent Number: 5,400,417
[45] Date of Patent: Mar. 21, 1995

[54] ELECTRO-OPTIC MODULATOR HAVING GATED-DITHER BIAS CONTROL

[75] Inventors: David J. Allie, Willimantic; James D. Farina, Tolland, both of Conn.

[73] Assignee: United Technologies Corporation, Hartford, Conn.

[21] Appl. No.: 281,712

[22] Filed: Jul. 27, 1994

Related U.S. Application Data

[63] Continuation of Ser. No. 69,895, Jun. 1, 1993, abandoned.

[51] Int. Cl.$^6$ .............................................. G02B 6/10
[52] U.S. Cl. ......................................... 385/2; 385/3; 359/245; 359/246
[58] Field of Search ....................... 359/245, 246, 254; 385/2, 3, 4

[56] References Cited

U.S. PATENT DOCUMENTS

| | | | |
|---|---|---|---|
| 4,274,067 | 6/1981 | Uzunoglu | 331/172 |
| 4,355,404 | 10/1982 | Uzunoglu | 375/86 |
| 4,356,456 | 10/1982 | Uzunoglu | 331/117 |
| 5,002,353 | 3/1991 | Johnson | 385/3 |
| 5,004,314 | 4/1991 | Booth | 385/2 |
| 5,168,534 | 12/1992 | McBrien | 385/3 |
| 5,199,086 | 3/1993 | Johnson | 385/2 |
| 5,218,468 | 6/1993 | Shaw | 385/2 X |

FOREIGN PATENT DOCUMENTS

| | | |
|---|---|---|
| 0444688 | 4/1991 | European Pat. Off. . |
| WO9310476 | 5/1993 | WIPO . |

OTHER PUBLICATIONS

Herczfeld, Peter, "Monolithic Microwave-Photonic Integrated Circuits: A Possible Follow-up to MIMIC", Microwave Journal, Jan. 1992, pp. 64, 69-72, 74, 76, 78.

Vifian, Hugo, Hewlett-Packard Co., Santa Rosa, Calif., "From Microwaves to Lightwaves The New Dimensions of Lightwave Measurements", Microwave Journal, Jan. 1993, pp. 24, 27-29, 32, 38, 40, 42.

Grimes, Gary, Ortel Corp, Alhambra, Calif., "Microwave Fiber-Optic Delay Lines: Coming of Age in 1992", Microwave Journal, Aug. 1992 pp. 61-62, 64-65, 69.

Lipsky, Stephen E., AEL Defense Corp., Landsdale, Pa., Daryoush, Afshin S., Drexel University, Philadelphia, Pa., "Fiber-Optic Methods for Injection Locked Oscillators", Microwave Journal, Jan. 1992, pp. 80, 82-83, 85-86, 88.

Kwon, David S., Naval Research Laboratory, Washington, D.C., "Effects of Phase Noise on Electro-Optical and Electric Systems", Microwave Journal Nov. 1992, pp. 67-70, 73, 75, 81.

Kashima, Norio, NTT Telecommunication Field Systems R&D Center, Ibaraki-ken, Japan, "A Transmitter and Receiver Laser Diode for Optical Subscriber Loop Systems", Microwave Journal, Aug. 1992, pp. 52, 55-56, 59.

Polifko, David, Ogawa, Hiroyo, ATR Optical and Radio Communications Research Laboratories, Kyoto,
(List continued on next page.)

Primary Examiner—Joseph A. Popek
Assistant Examiner—Son Mai

[57] ABSTRACT

An electro-optic modulator includes a closed loop bias control system for maintaining the modulator at its half-power point by modulating a time varying signal on and off at a modulation frequency $f_m$. The modulation frequency $f_m$ is much lower than the frequency components within the spectrum of the time varying signal, such that, energy within the time varying signal spectrum is recovered at the modulation frequency when the modulator is not operating at the half-power point. A phase sensitive demodulator operating at the modulation frequency $f_m$ demodulates a signal indicative of the modulator optical output signal to provide a DC voltage signal value indicative of the half-power point bias error value. The time varying voltage signal may be a dither noise signal or any other time varying signal such as a signal with a single frequency component (e.g. a sine or cosine) or a signal with a plurality of frequency components (e.g., a square wave).

22 Claims, 5 Drawing Sheets

OTHER PUBLICATIONS

Japan, "The Merging of Photonic and Microwave Technologies", Microwave Journal, Mar. 1992, pp. 75–78, 80.

Lee, M., Terbrack, W., Buckley, R.; "New Robust Bias Control Method for Optical Modulators"; SPIE vol. 1291 Optical and Digital GaAs Technologies for Signal-Processing Applications (1990) pp. 55–65.

Jiang, Q. & Kavehrad, M.; "A Subcarrier-Multiplexed Coherent FSK System Using a Mach–Zehnder Modulator with Automatic Bias Control"; IEEE Photonics Technology Letters, vol. 5, No. 8, Aug. 1993; pp. 941–943.

Kataoka et al.; "Novel Automatic Bias Voltage Control for Travelling-Wave Electrode Optical Modulators"; Electronics Letters 23rd May 1991 vol. 27 No. 11 pp. 943–945.

"Automatic Adjustment of the Position of the Operating Point of an Electrooptical Modulator" by V. I. Grigor'evskii, B. L. Davydov, and A. N. Lomakin, Instruments and Experimental Techniques, vol. 25, No. 5, Part 2, Sep.–Oct. 1982, New York, USA.

"Patent Abstracts of Japan", vol. 18, No. 146 (P-1707), Oct. 3, 1994 & JP, A, 05323245 (NEC Corp) Jul. 12, 1993.

ELECTRO-OPTIC MODULATOR HAVING GATED-DITHER BIAS CONTROL

This is a continuation of application Ser. No. 08/069,895, filed on Jun. 1, 1993, now abandoned.

TECHNICAL FIELD

This invention relates to an electro-optic modulator and more particularly to an electro-optic modulator employing gated dither bias control.

BACKGROUND ART

A trend in optical communication systems is to integrate functions traditionally performed by discrete optical components onto an integrated optic ("IO") device. These functions include polarizers, filters, modulators, directional couplers, waveguides, etc. The IO device is typically fabricated from a substrate of lithium niobate (LiNbO$_3$) or lithium tantalate (LiTaO$_3$) and has a waveguide formed on a major surface. Common waveguides include the Mach-Zehnder and Balanced-Bridge interferometers. In the Mach-Zehnder, an input optical signal (e.g., from a laser) is split at a Y-junction in the waveguide into two equal components. "Mach-Zehnder" refers to the waveguide Y-junctions and arms, along with the modulators. Each component travels in a corresponding arm of the waveguide before being recombined at a second Y-junction.

To create an optical modulator using the Mach-Zehnder waveguide, electrically conductive electrodes are formed on the waveguide surface in the vicinity of the waveguide arms. A time varying voltage applied to the electrodes produces an electric field in the IO device substrate which changes the relative indices of refraction and therefore the optical path lengths of the waveguide arms. Modulation of the optical input signal occurs due to the fact that the relative phase of the optical signals in the arms varies according to the instantaneous amplitude of the time varying electrical signal driving the electrodes. The varying phase results in varying intensity of the optical signal at the interferometer output.

Since the modulator operates on light interference principles, its transfer function when properly biased is a sine function which imposes odd harmonic distortion to applied signals. In order to avoid generating second harmonics on the modulator output signal, a DC voltage bias signal is applied to the modulator to maintain the operating point about the half-power point of the modulator. The half-power point is the point on the transfer function sine curve where the slope (i.e., optical throughput/voltage) is a maximum. This corresponds to a 90° relative phase shift between the two arms of the modulator. FIG. 1 is graphical illustration of the modulator's sine wave transfer function. Optical throughput is plotted along the vertical axis and bias voltage is plotted along the horizontal. The half power points are as illustrated as $V_{\pi/2}$ and $-V_{\pi/2}$ since the modulator can operate on either the positive or negative slope of the sine wave. In general, the modulator can be biased at any odd multiple of $V_{\pi/2}$ or $-V_{\pi/2}$ for proper operation.

The modulator typically receives an electrical data carrying input signal which modulates the light wave within the modulator to transfer the data content in the electrical signal to the lightwave. However, problems arise when the modulator is not properly biased to operate at its half-power point and as a result undesirable even harmonics are coupled into the output signal of the modulator. Therefore, closed loop bias control is often employed to ensure the modulator maintains its operating point within the linear region about the half-power point. Even harmonic distortion arises when the modulator is not operating at its half-power point which is a well known problem in the field of multichannel optical communication systems, such as a system for cable-television ("CATV") which utilizes the modulator to convert a data carrying radio frequency ("RF") signal to an optical data carrying signal.

A CATV system may have 75 channels operating at different carrier frequencies all multiplexed into a single signal for transmission within a frequency range of 50–500 MHz. This large number of closely-spaced carriers places strict requirements on the linearity of system elements such as the modulator in order to reduce the undesired harmonic distortions.

Conventional closed loop bias control systems superimpose an AC signal test tone (e.g., a sine wave) on the DC bias voltage value applied to the bias electrodes of the modulator. If the modulator is not operating at its half-power point, second harmonics of the AC signal test tone are created within the frequency spectrum of the modulator output signal. The magnitude of the second harmonic of the AC signal is indicative of the error between the desired DC bias signal value and the actual DC bias signal value. As an example, if there is no second harmonic energy within the frequency spectrum of the output signal the modulator is currently operating at its half-power point and therefore no bias error exists. However, if second harmonic energy is present, a bias error exists and the bias signal value is adjusted to null the bias error.

A problem plaguing bias control systems are errors due to the limited dynamic range of known detection systems. This problem arises due to the fact that as steady state half-power point operation is approached, the magnitude of the second harmonic energy drops off very quickly while the fundamental remains relatively unchanged. Amplification and phase sensitive demodulation of the control signals is difficult when the signal of interest (namely the second harmonic) co-exists with a sizeable fundamental frequency component. Typically the relative size of the fundamental frequency component can be reduced somewhat through the use of well known filtering techniques. However, the implementation of these filtering techniques typically requires a fourth or fifth order filter to provide the amount of attenuation necessary for high accuracy bias control. Filters of such a high order are often cumbersome and impractical.

DISCLOSURE OF THE INVENTION

An object of the present invention is to provide an electro-optic modulator for transforming a data carrying input signal into a data carrying modulated optical output signal while reducing the magnitude of the input signal's second harmonic which is coupled to the data carrying modulated optical output signal.

Another object of the present invention is to provide an electro-optic modulator bias control system which reduces the magnitude of the second harmonic energy coupled to the data carrying optical output signal by operating the electro-optic modulator about its half-power point.

Yet another object of the present invention is to provide an electro-optic modulator bias control system which is capable of nulling the bias control error to zero.

According to the present invention an electro-optic modulator includes a closed loop bias control system for maintaining the modulator at its half-power point by modulating a time varying electrical signal (e.g., the dither signal) on and off at a modulation frequency which is much lower than the frequency components within the spectrum of the time varying electrical signal, such that, energy within the time varying electrical signal spectrum is recovered at the modulation frequency value when the electro-optic modulator is not operating at the half-power point; a phase sensitive demodulator operating at the modulation frequency demodulates a signal indicative of the data carrying optical output signal to provide a DC voltage signal value indicative of the half-power point bias error value. In general, the frequency spectrum of the time varying electrical signal is irrelevant because the energy is recovered within the modulation frequency spectrum.

An advantage of the present invention is the bias voltage signal error value is driven towards zero ensuring modulator operation about the half-power point and thus less harmonic distortion on the modulator's data carrying optical output signal.

Another advantage of the present invention is that a easily manufactured high accuracy bias control is provided with a time varying electrical signal having a very low spectral energy density. In particular the time varying electrical signal may be a noise signal or any other time varying signal such as a signal with a single frequency component (e.g. a sine or cosine) or a signal with a plurality of frequency components (e.g., a square wave). In addition, the present invention provides a system designer with a great deal of versatility in the placement of the frequency spectrums of the modulation signal and the time varying electrical signal relative to the frequency spectrum of the data carrying signal.

These and other objects, features and advantages of the present invention will become more apparent in light of the following detailed description of a preferred embodiment thereof, as illustrated in the accompanying drawings.

BEST MODE FOR CARRYING OUT THE PRESENT INVENTION

Figure 2:
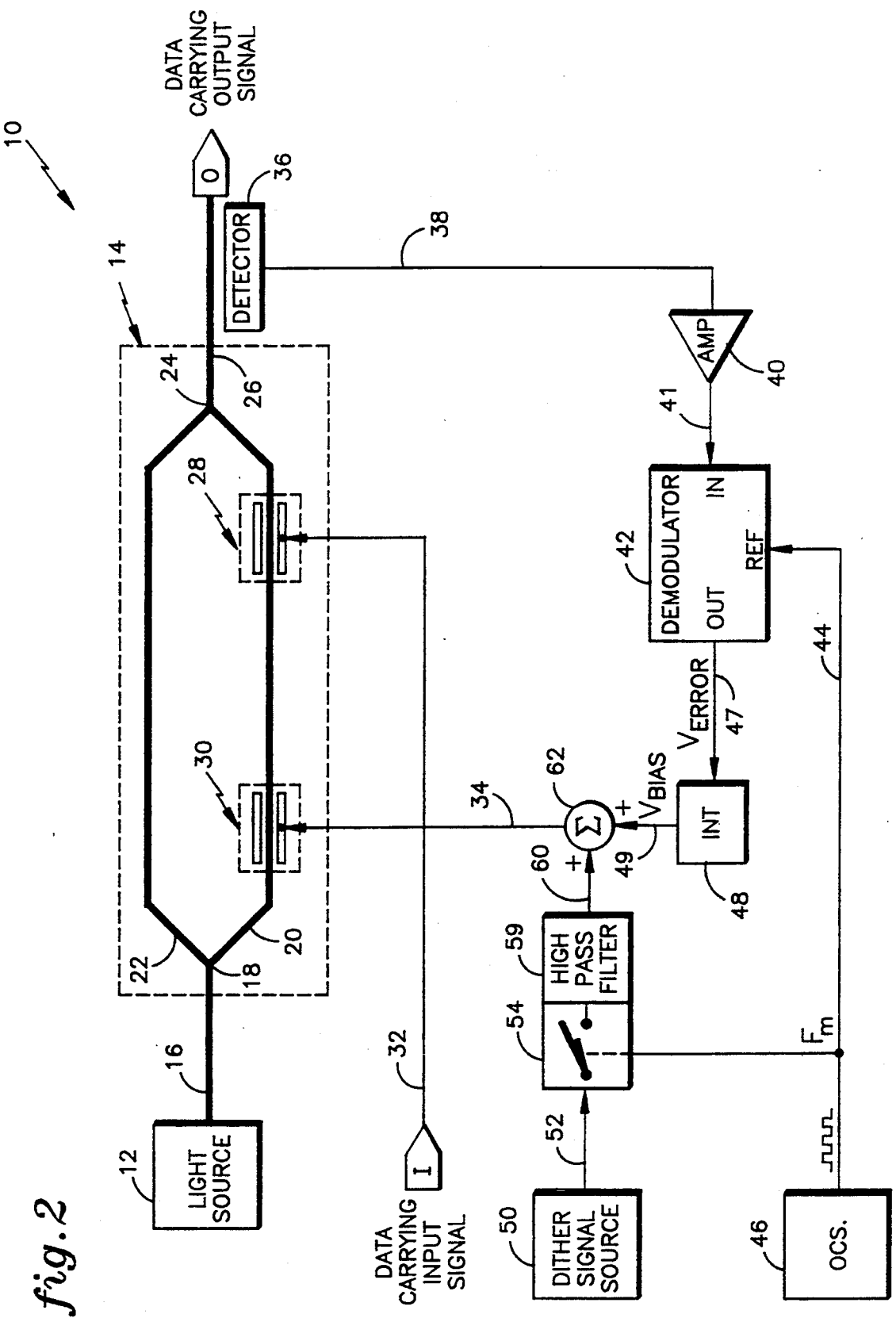
FIG. 2 illustrates a functional block diagram of a bias controlled electro-optic modulator system according to the present invention.

FIG. 2 illustrates a functional block diagram of a gated dither electro-optic modulator system 10. The system includes a light source 12 (e.g., a laser or laser diode) which provides an optical signal to electro-optic modulator 14 via a waveguide 16. The waveguide 16 interfaces with a splitter 18 which splits and routes the optical signal evenly along optical waveguides 20,22. The split optical signals recombine at a combiner 24 and the recombined signal propagates in an output signal waveguide 26.

The modulator 14 includes two sets of electrodes: input signal electrodes 28 and bias electrodes 30. The input signal electrodes 28 receive a data carrying (e.g., an RF signal) input signal along a line 32 and in a well known manner modulate the optical signal in the waveguide 20 as a function of the voltage signal value across the electrodes 28. The bias electrodes 30 receive a bias dither test tone signal value on a line 34 which maintains the modulator at its half-power point.

The system 10 also includes a photodetector 36 which detects and provides an electrical sensed signal on a line 38 indicative of the data carrying optical output signal value within the waveguide 26. The electrical sensed signal is input to an amplifier 40 which provides a signal on a line 41 to a phase sensitive demodulator 42. The demodulator 42 also receives a periodic signal value on a line 44 from an oscillator 46 (e.g., a crystal) having a frequency $f_m$ (e.g., 9.2 KHz). The demodulator 42 demodulates the signal on the line 41 in a well known manner and provides a demodulator output signal $V_{error}$ on a line 47 whose value is indicative of the bias error from the half-power point.

The demodulator output signal on the line 47 is input to an integrator 48 which integrates over time and provides a DC voltage signal $V_{bias}$ on the line 49 whose value is indicative of the amount of voltage necessary to bias the eomodulator 14, such that, the eomodulator operates at the half-power point. If the frequency spectrum of the data carrying output signal within waveguide 26 contains negligible power at $f_m$ the demodulator output signal $V_{error}$ on the line 47 will be approximately zero volts. Similarly, if the frequency spectrum of the data carrying output signal within the waveguide 26 contains power at $f_m$ the demodulator will provide a non-zero $V_{error}$ value indicative of the bias error due to the fact that the eomodulator is not operating at its half-power point.

According to the present invention, a dither signal source 50 provides a time varying electrical signal (e.g., a dithered voltage signal), such as white noise on a line 52 to an analog switch 54 (e.g., part #74HC4316 available from National Semiconductor or Harris Corporation). The dither signal source may be a noise diode or "shot noise" associated with current flow through a resistor. An example of a noise diode is part number NC302L produced by Noise/COM. However, any source which generates a time varying electrical signal (either periodic or aperiodic) may be used as the dither signal source 50.

Figure 3:
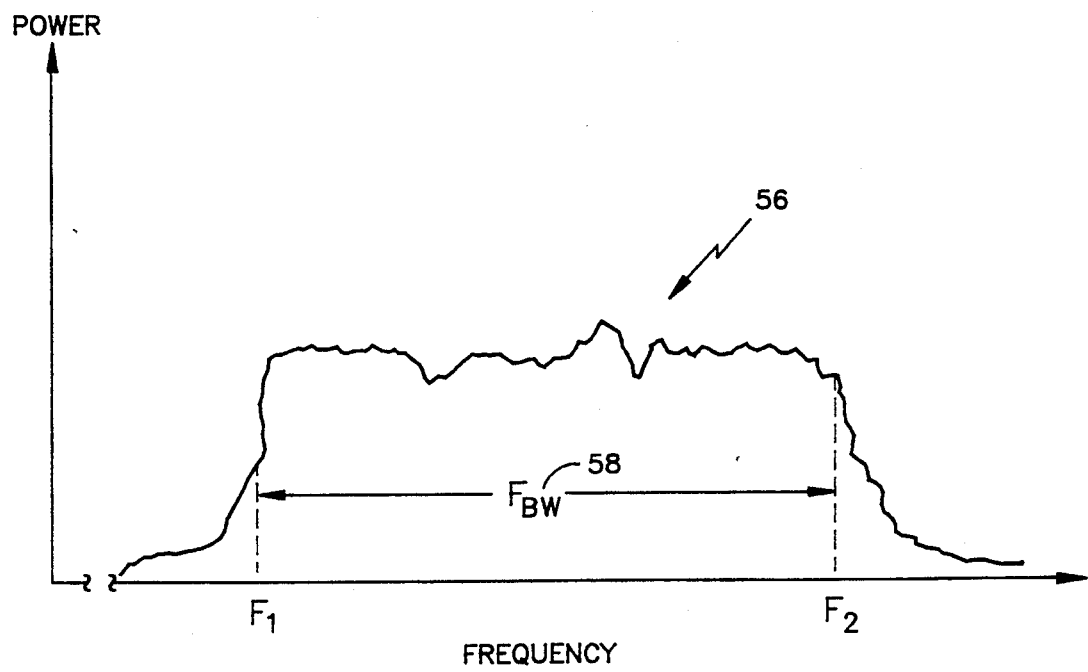
FIG. 3 is a graphical illustration of a possible frequency spectrum for the time varying electrical dither signal on the line 52 (FIG. 2)

FIG. 3 is a graphical illustration 56 of a frequency spectrum 58 for the time varying electrical signal on the line 52. Power is plotted along the vertical axis and frequency along the horizontal axis. The frequency spectrum 58 of the time varying electrical signal has a bandwidth $f_{bw}$ spanning $f_1$ to $f_2$ with relatively uniform energy distribution. Exemplary values of $f_1$ and $f_2$ may be 100 KHz and 1 MHz respectively. In general, $f_1$ and $f_2$ should be greater (e.g., an order of magnitude greater) than $f_m$ for baseband demodulation.

Referring back to FIG. 2, the analog switch 54 is controlled by the modulation signal on the line 44 from the oscillator 46. The switch provides a modulated dither signal to a high pass filter 59 whose break frequency is selected to pass the frequency components within the frequency spectrum $f_{bw}$ 58 (FIG. 3) of the dither signal while significantly attenuating the energy at $f_m$. As an example the break frequency for the high pass filter may be selected at 100 KHz for $f_m$ equal to 9.2 KHz and a dither signal frequency spectrum $f_{bw}$ of 100 KHz to 1 MHz. The filter provides a dither test tone signal on a line 60 to a summing block 62 which also receives the bias voltage signal $V_{bias}$ on the line 49. The summer block 62 provides a biased dither test tone signal on the line 34 to the bias electrodes 30. One of ordinary skill in the art will appreciate that the modulation occurs by virtue of the gating (e.g., the controlled opening and closing) of the switch. An illustration of the modulated dither signal on the line 60 is now in order.

Figure 4A:
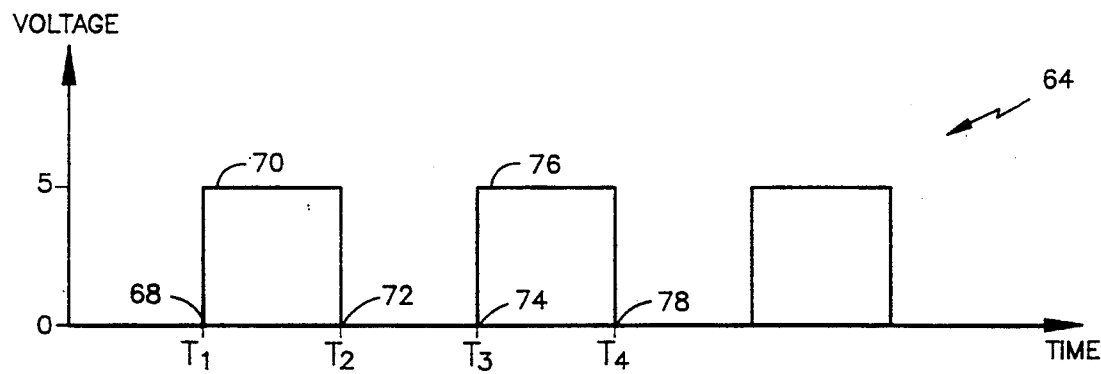
FIGS. 4A and 4B graphically illustrate the oscillator output (FIG. 2) versus time and the modulated dither signal versus time respectively.
Figure 4B:
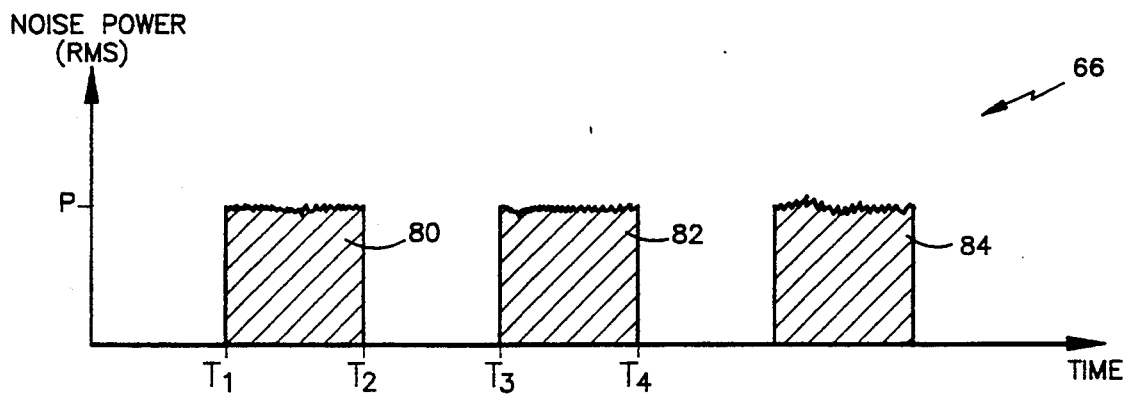

FIG. 4A illustrates a plot 64 of voltage versus time for the modulation signal $f_m$ on the line 44 from the oscillator 46. The modulation signal $f_m$ includes a pulse train of square waves having a 50% duty cycle and standard CMOS voltage levels (e.g., 0 and 5 vdc). FIG. 4B illustrates a plot 66 of the dither test tone signal on the line 60. Referring to both FIGS. 4A and 4B, at time $T_1$ 68 a first voltage pulse 70 of the periodic signal goes active which closes the analog switch allowing the signal on the line 52 to pass to the filter output on the line 60. At time $T_2$ 72 the first voltage pulse 70 goes inactive and the analog switch is opened. At $T_3$ 74 a second voltage pulse 76 goes active and the analog switch is again closed. At time $T_4$ the analog switch is opened. The result of the controlled opening and closing of the analog switch is the placement of gated dither "pulses" 80,82,84 illustrated in FIG. 4B onto the line 60. The frequency spectrum of each of the gated dither "pulses" 80,82,84 within the dither test tone signal is essentially identical to the frequency spectrum $f_{bw}$ 58 of the dither signal on the line 52 (FIG. 2).

Due to the second order nature of the modulator 14, energy within the frequency spectrum $f_{bw}$ of each gated pulse 80,82,84 is recovered at $f_m$ if the modulator 14 is not operating at its half-power point. In general any AM modulation will be recovered at baseband in any eomodudulator system whose transfer function possesses a quadratic component. That is, if the operating point of the eomodulator shifts from the half-power operating point, the frequency spectrum of the data carrying output signal in the wavegude 26 will contain energy at the frequency value $f_m$. The data carrying output signal can then be demodulated to determine the magnitude of the energy at the fequency value $f_m$ which is indicative of the bias error from the half power point. The detection and baseband demodulation of energy indicative of the bias error is best understood with a plot of energy versus frequency.

Figure 5:
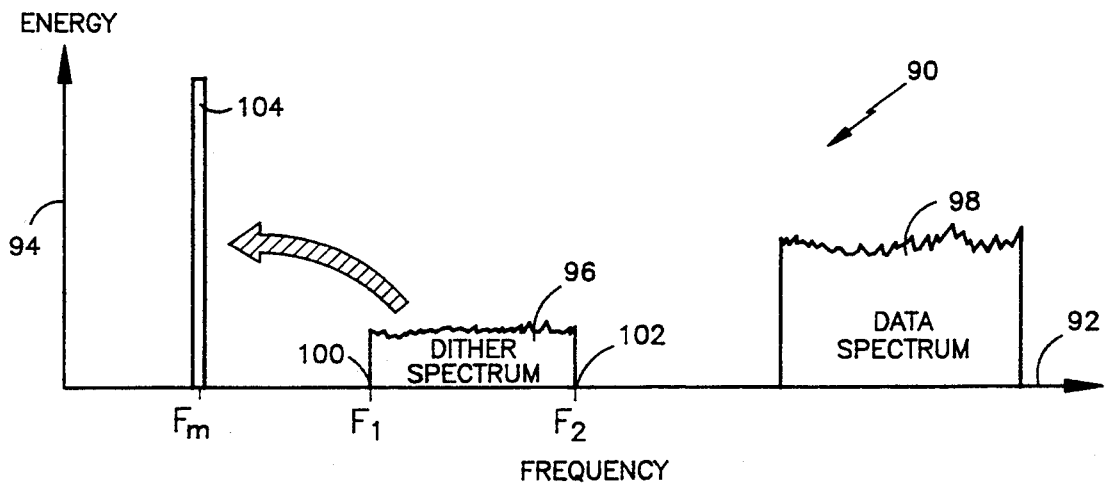
FIG. 5 is a graphical illustration of a frequency spectrum of the data carrying optical output signal within the waveguide 26.

FIG. 5 is a graphical illustration of a frequency spectrum 90 of the data carrying output signal within the waveguide 26, where frequency is plotted along horizonal axis 92 and energy is plotted along a vertical axis 94. The frequency spectrum 90 includes a dither subspectrum 96 indicative of energy associated with the test tone dither signal on the line 60, and a data carrying subspectrum 98 indicative of the energy associated with data within the data carrying output signal. The dither subspectrum 96 has a bandwidth bounded by a first frequency value $f_1$ 100 and a second frequency value $f_2$ 102. As discussed hereinbefore, if the modulator is not properly biased for operation at the half-power point energy within the dither spectrum 96 will be recovered at the modulating frequency $f_m$ and the resultant energy at the modulating frequency $f_m$ is indicative of the bias error. Thus assuming the modulator 14 is not properly biased for operation at the half-power point, energy within the dither spectrum 96 will be recovered at the modulating frequency $f_m$ resulting in a frequency component 100 whose energy is indicative of the bias error. The demodulator 42 (FIG. 2) detects the energy at the frequency component 100 and the bias control system adjusts $V_{bias}$ to drive the modulator 14 to a steady state operating point about the half-power point. An advantage of gated dither bias control is that the dither energy is spread over a broad part of the frequency spectrum resulting in elevation of the noise floor throughout the dither subspectrum 96. In general the modulation signal frequency value $f_m$ should be selected to be at a frequency value above the noise created by the light source 12.

Figure 6:
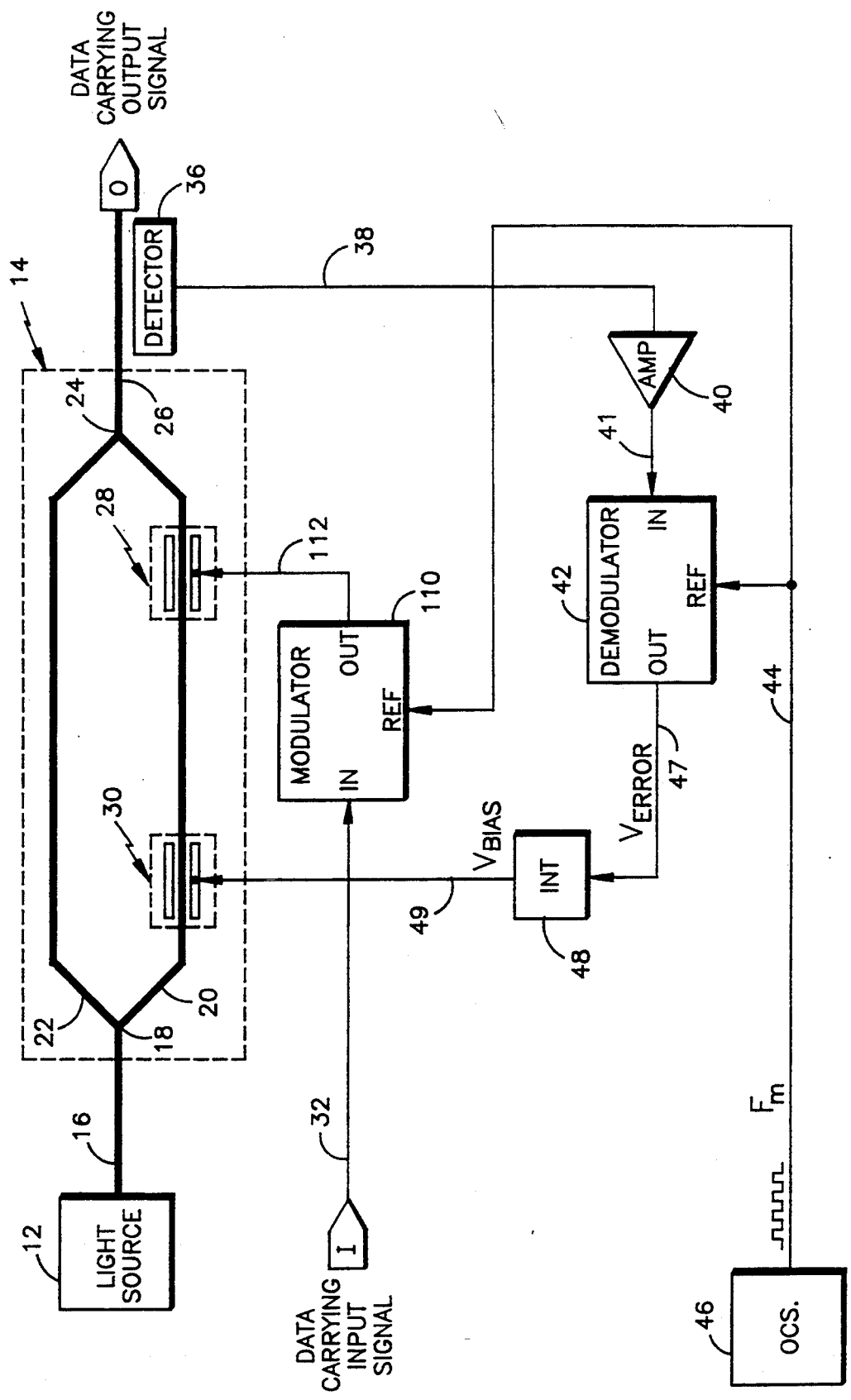
FIG. 6 illustrates an alternative embodiment of the present invention.

The present invention is certainly not limited to one embodiment. FIG. 6 illustrates an alternative embodiment of the present invention which modulates the data carrying input signal on the line 32 with the modulation signal on the line 44. The numerical designators for common elements from FIG. 2 have been retained in FIG. 6 wherever possible in the interest of clarity and brevity. A modulator 110 receives the data carrying input signal on the line 32 and modulates the input signal using the modulation signal on the line 44 as the reference signal. The result is a modulated data carrying signal on a line 112 which is applied to the input signal electrodes 30. If the eomodulator is not operating at the half-power point, energy indicative of the bias error is recovered at the frequency value $f_m$. Thus, the data carrying optical output signal within the waveguide 26 can be detected and demodulated to determine the energy at $f_m$ and hence the bias error. Note, it is assumed the demodulator reference signal is of known phase relative to the modulator reference signal in order to achieve phase sensitive demodulation.

Figure 7:
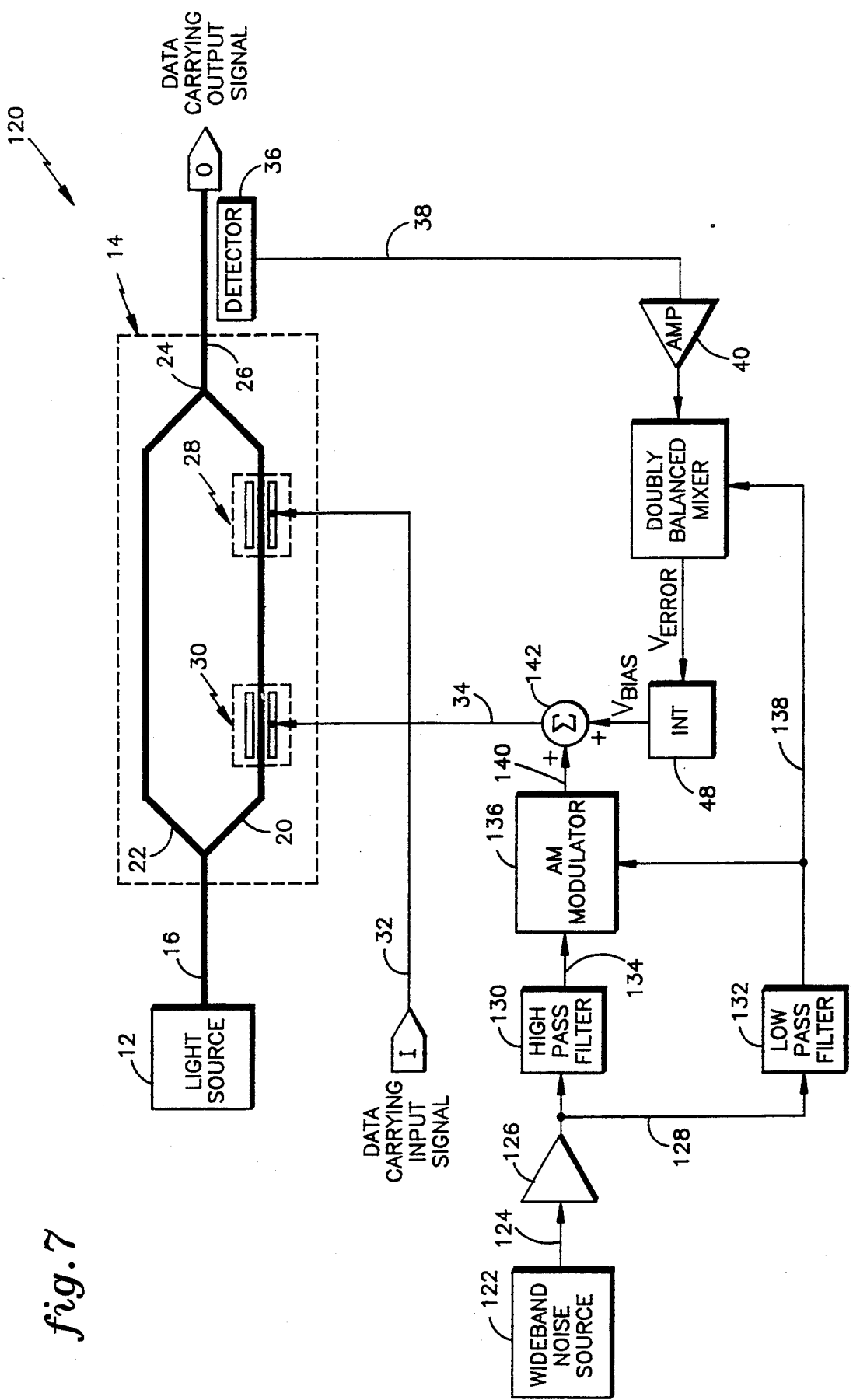
FIG. 7 illustrates yet another alternative embodiment of the present invention which uses a noise modulated noise bias control system.

FIG. 7 illustrates yet another alternative embodiment 120 of the present invention which uses a noise modulated noise bias control system. A wideband noise source 122 provides a noise signal on a line 124 to a buffer 126. The buffer 126 provides a buffered noise signal on a line 128 to a high pass filter 130 and to a low pass filter 132. The high pass filter 130 provides a high band noise signal (e.g., 100–1000 KHz) on a line 134 to an AM modulator 136 which also receives a low band noise signal (e.g., 1–10 KHz) on a line 138 from the low pass filter 132. The AM modulator 136 provides a noise modulated noise signal on a line 140 to a summer 142 which also receives the bias signal $V_{bias}$ from the integrator 48. Testing has shown that in the noise modulated noise bias control system 120, if the modulator 14 is not operating at its half power point, energy recovered within the frequency spectrum of the low band noise (e.g., 1–10 KHz) can be used as the feedback signal to drive and maintain the eomodulator to its half-power point.

Figure 1:
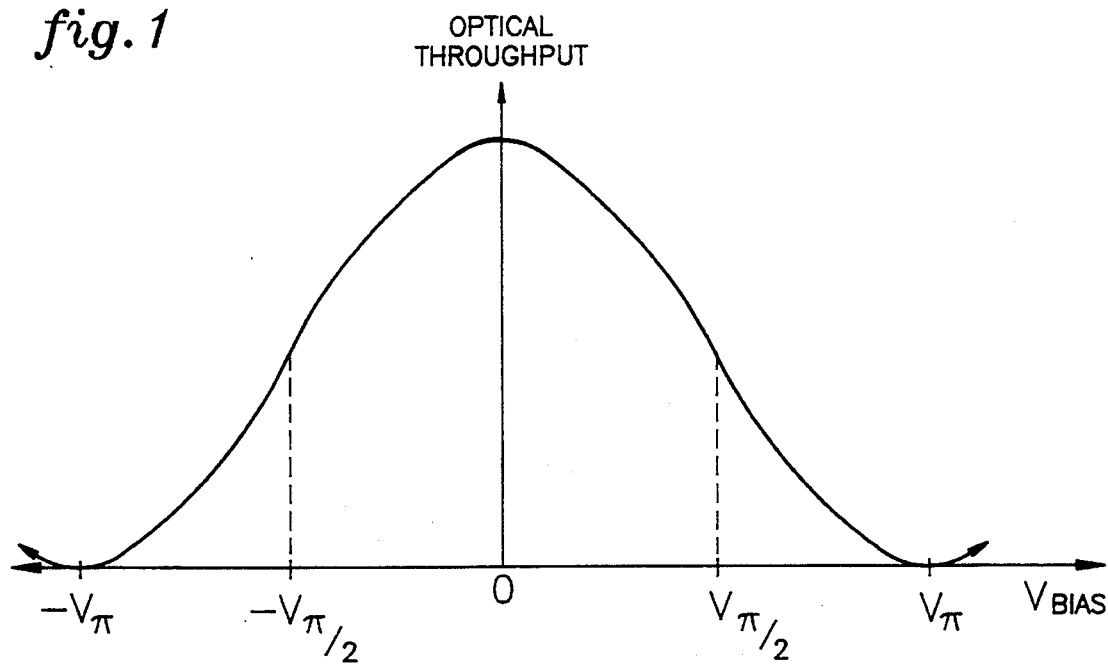
FIG. 1 illustrates the transfer function for an electro-optic modulator.

The present invention is not limited to the use of only noise dither. The time varying electrical signal on the line 52 can be any time varying electrical signal such as (but certainly not limited) to white noise, a sine or cosine waveform, a square wave or a triangular waveform. In addition, although the energy within the frequency spectrum of the time electrical signal has been referred to as having a uniform distribution, one of ordinary skill in the art will certainly understand that any distribution can be used with the present invention including gaussian and random. While obvious, it should be noted that the eomodulator may operate at a half-power point on either the positive or negative slope of the transfer function (FIG. 1).

The present invention is also not limited to Mach-Zehnder modulators; it's anticipated that the present invention may also be used with other well known interferometers such as a balanced bridge interferometer. The bias control system of the present invention can be used to control the bias point (e.g., the half-power point) of any modulator whose transfer function possesses a quadratic component.

Although the present invention has been shown and described with respect to a preferred embodiment thereof, it should be understood by those skilled in the art that various other changes, omissions, and additions may be made to the embodiments disclosed herein, without departing from the spirit and scope of the present invention.

We claim:

1. An electro-optic modulator bias control system for maintaining the operating point of an electro-optic modulator at the half-power point, which receives a detected data carrying electrical signal indicative of the electro-optic modulator's optical data carrying output signal, the bias control system comprising:
   means for generating a time varying electrical signal;
   means for generating a modulation signal having a certain frequency spectrum $f_m$;
   means for modulating said time varying electrical signal with said modulation signal and for providing a dither test tone signal;
   a demodulator which demodulates a detected data carrying signal using said modulation signal as the reference and provides an output signal $V_{error}$ whose value is indicative of the phase and the amount of energy within the frequency spectrum of said detected data carrying signal within said frequency spectrum $f_m$;
   means for integrating over time said output signal $V_{error}$ and for providing a signal $V_{bias}$ indicative of the integrated value; and
   means for summing said signal $V_{bias}$ and said dither test tone signal to provide a bias dither signal value for driving the modulator to the half power point.

2. The electro-optic modulator bias control system of claim 1, wherein said means for generating said time varying electrical signal includes a noise source generator such that said time varying signal is an electrical noise signal.

3. The electro-optic modulator bias control system of claim 2 wherein said means for generating a modulation signal includes an oscillator which provides a periodic waveform such that said modulation signal is a periodic signal.

4. An electro-optic modulator system which receives an optical signal from an optical source, and an electrical data carrying input signal, and modulates the optical signal to encode the optical signal with the data content of the electrical data carrying input signal, said system comprising:
   an electro-optic modulator which receives the electrical data carrying input signal and modulates the optical signal with the data carrying input signal to provide an optical data carrying output signal;
   means for biasing said electro-optic modulator to maintain the operating point of said modulator at the half-power point, comprising
      means for providing a time varying electrical signal;
      means for providing a modulation signal and for modulating said time varying electrical signal with said modulation signal to provide a dither test tone signal;
      means for detecting said optical data carrying output signal within said electro-optic modulator and for providing a detected electrical signal indicative thereof, and
      means for demodulating said detected electrical signal with said modulation signal to provide a signal $V_{error}$, for integrating over time said signal $V_{error}$ and providing a signal $V_{bias}$ indicative of the integrated value, and for summing said signal $V_{bias}$ with said dither test tone signal and applying the resultant summed signal to said electro-optic modulator to maintain said modulator at its half-power point.

5. An electro-optic modulator system, which receives an optical signal from an optical source, and an electrical data carrying input signal, and modulates the optical signal to encode the optical signal with the data content of the electrical data carrying input signal, said system comprising:
   a biased electro-optic modulator which receives the data carrying input signal and modulates the optical signal with the data carrying input signal to provide an optical data carrying output signal;
   a first signal source which provides a time varying electrical signal;
   a second signal source which provides a modulation signal;
   a closed loop bias control system including, means for maintaining said electro-optic modulator at its half-power point by modulating said time varying electrical signal with said modulation signal to create a dither test tone signal, such that, the frequency spectrum of the optical data carrying output signal contains energy within the frequency spectrum of said modulation signal and provides a signal $V_{error}$ indicative thereof when said modulator is not operating at the half-power point, means for integrating said signal $V_{error}$ and providing a signal value $V_{bias}$ indicative of the integrated value, means for summing said signal value $V_{bias}$ with said dither test tone signal and means for applying the resultant summed signal to said modulator to maintain the operating point of said modulator at the half-power point.

6. A bias controlled electro-optic modulator system which receives an electrical data carrying input signal, and an optical signal from a light source, and provides an optical data carrying output signal, comprising:
   an electro-optic modulator which modulates the optical signal with both the data carrying input signal and a biased dither test tone signal to provide said optical data carrying output signal;
   a bias control system including
      a first signal generator which provides a time varying electrical signal;

a second signal generator which provides a modulation signal;

a modulator which modulates said time varying electrical signal with said modulation signal to provide a dither test tone signal;

an optical detector which detects said optical data carrying output signal and provides a detected electrical signal indicative thereof;

a demodulator which demodulates said detected electrical signal with said modulation signal and provides a signal $V_{error}$ indicative of the demodulated signal;

an integrator which integrates said signal $V_{error}$ over time and provides a signal $V_{bias}$ indicative of the integrated value of said signal $V_{error}$; and a summer which sums said signal $V_{bias}$ with said dither test tone signal and provides said biased dither test tone signal value indicative of the summed value to said electro-modulator to drive said electro-optic modulator to its half-power point.

7. The bias controlled electro-optic modulator of claim 6 wherein said second signal generator includes an oscillator which provides a periodic signal value such that the frequency spectrum of said modulation signal includes a dominate periodic frequency component $f_m$.

8. The bias controlled electro-optic modulator of claim 7 wherein said first signal generator includes an electrical noise signal source, such that the frequency spectrum of said modulation signal is primarily electrical noise.

9. The bias controlled electro-optic modulator of claim 6 wherein said electro-optic modulator is formed on an integrated-optic substrate having Mach-Zehnder waveguides and electrically conductive bias electrodes formed on the substrate surface sandwiching a leg of the Mach-Zehnder waveguide, such that said biased dither test tone signal value is applied to said bias electrodes to drive said electro-optic modulator to its half-power point.

10. The bias controlled electro-optic modulator of claim 9 wherein said integrated-optic substrate is lithium niobate.

11. The bias controlled electro-optic modulator of claim 10 wherein said integrated-optic substrate is lithium tantalate.

12. The bias controlled electro-optic modulator of claim 6 wherein said electro-optic modulator is a balanced bridge modulator formed on a lithium niobate substrate.

13. The bias controlled electro-optic modulator of claim 6 wherein said time varying electrical signal is a signal whose voltage value is time varying.

14. The electro-optic modulator bias control system of claim 2 wherein said means for generating a modulation signal includes a noise signal source such that the frequency spectrum of said modulation signal is primarily electrical noise.

15. A bias controlled electro-optic modulator system which receives an electrical data carrying input signal, and an optical signal from a light source, and modulates the optical signal to encode the optical signal with the data within the electrical data carrying input signal to provide an optical data carrying output signal; said system comprising:

an electro-optic modulator including waveguides through which the optical signal propagates and a set of input signal electrodes formed across a portion of said waveguide to which the electrical data carrying input signal is applied to modulate the optical signal within said waveguide, and a set of bias signal electrodes also formed across said waveguide and to which a biased dither test tone signal received from a closed loop bias control system is applied to maintain the operating point of said electro-optic modulator at its half-power point, wherein the resultant electro-optic modulator output signal is said optical data carrying output signal;

said closed loop bias control system includes an optical detector which detects said optical data carrying output signal and provides a detected electrical signal indicative thereof, a first signal generator which generates a time varying electrical signal;

a second signal generator which generates a modulation signal $f_m$;

a modulator which modulates said time varying electrical signal with said modulation signal $f_m$ to provide a dither test tone signal;

a demodulator which demodulates said detected electrical signal with said modulation signal $f_m$ and provides a signal $V_{error}$ indicative of the demodulated signal;

an integrator which integrates said signal $V_{error}$ over time and provides a signal value $V_{bias}$ indicative of the integrated value of said signal $V_{error}$; and a summer which sums said signal $V_{bias}$ with said dither test tone signal and provides said biased dither test tone signal value indicative of the summed value to said second set of electrodes to drive said electro-optic modulator to its half-power point.

16. The bias controlled electro-optic modulator of claim 15 wherein said first signal generator includes an electrical noise source which generates said time varying electrical signal as an electrical noise signal.

17. The bias controlled electro-optic modulator of claim 16 wherein said second signal generator includes a periodic signal generator which generates said modulation signal as a periodic electrical signal.

18. The bias controlled electro-optic modulator of claim 16 wherein said second signal generator includes an electrical noise source which generates said modulation signal as an electrical noise signal.

19. The bias controlled electro-optic modulator of claim 16 wherein said optical detector includes a photo detector.

20. The bias controlled electro-optic modulator of claim 19 wherein said optical detector includes an electrical amplifier which amplifies said detected electrical signal.

21. The bias controlled electro-optic modulator of claim 20 wherein said modulator includes a high pass filter which filters the output signal of said modulator to provide said dither test tone signal.

22. The bias controlled electro-modulator of claim 21 wherein said electro-optic modulator is a Mach-Zehnder electro-modulator configuration formed on a lithium niobate substrate.

* * * * *